Nov. 11, 1930.  J. PETERSEN  1,781,077
BATTERY LIFTER
Filed Nov. 29, 1929

JOHN PETERSEN INVENTOR.
BY
Merrill M. Blackburn
ATTORNEY

Patented Nov. 11, 1930

1,781,077

UNITED STATES PATENT OFFICE

JOHN PETERSEN, OF DURANT, IOWA

BATTERY LIFTER

Application filed November 29, 1929. Serial No. 410,339.

The present invention relates to a device for lifting and carrying batteries but more especially designed to remove batteries from the battery boxes of automobiles. Among the objects of this invention are to provide a device for the purpose indicated which is adaptable for use with any size of battery in common use; to provide a device which is self-sustaining in any position of adjustment so that it may be readily applied where intended to be used by the operator using only one hand; to provide a device of the character indicated which will readily hold itself in position in the battery handles and will not readily become accidentally detached; and such further objects, advantages and capabilities as will hereafter appear and as are inherent in the construction disclosed herein. My invention further resides in the combination, construction and arrangement of parts illustrated in the accompanying drawing and, while I have shown therein what is now considered the preferred embodiment of this invention, I desire the same to be understood as illustrative only and not to be construed in a limiting sense.

Figure 1:
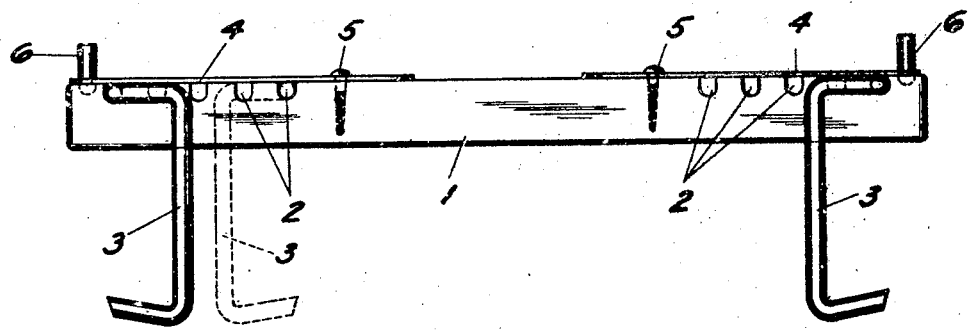
Figure 2:
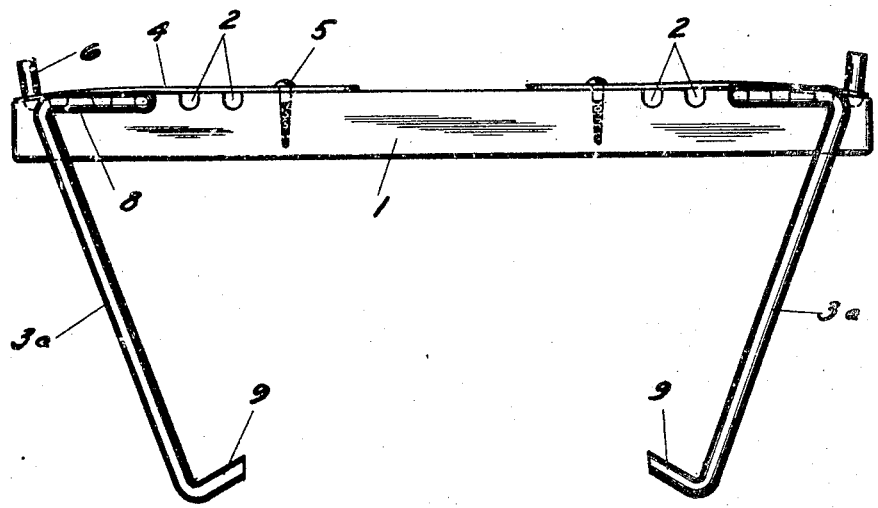
Figure 3:
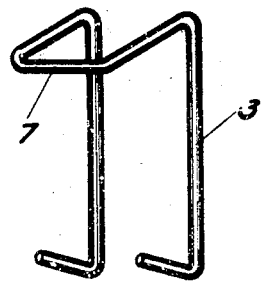

In the drawing annexed hereto and forming a part hereof Fig. 1 is a side elevation of one form of my device; Fig. 2 is a similar elevation of a slightly modified form thereof and Fig. 3 is a perspective of one of the hooks.

Referring more in detail to this drawing, a handle 1 is shown as provided with a plurality of notches at each end, the notches being designated by the numeral 2. These notches receive hooks 3 whose general form is shown in Fig. 3. Spring members 4 are pivoted at 5 to the wooden handle 1 and are provided with handles 6 by means of which they may be swung to one side or the other of the member 1 so as to permit desired shifting of position of one or more of the hooks 3. The spring members 4 are supposed to press downwardly upon the cross bars 7 sufficiently so that the hooks 3 are normally retained in any adjusted position in which they may be placed.

As shown at the left side of Fig. 1 the hooks 3 may be turned to face either inwardly or outwardly and may be placed with the cross bars 7 in any one of the notches 2. Where it is more convenient to attach the lifter to the battery handles from the inside, the hooks are placed in the positions shown in solid lines in Fig. 1. Where it is more convenient to get at the battery handles from the outside, the hooks are turned to the position shown by the dotted lines in Fig. 1 or solid lines in Fig. 2. If one wishes to remove several batteries from one place to another and these batteries are not located in battery boxes, but are resting upon a floor, bench, or other similar support, the hooks may be put in the positions indicated by solid lines at the right of Fig. 1 and the dotted lines at the left of this figure. One can then apply the battery lifter to the batteries without any adjustment or manipulation other than placing the hooks adjacent the openings in the handles, moving the lifter so that the hooks enter the openings and then lifting the lifter. To remove the lifter the operation is merely the reverse of that described.

The arms 8 of the hooks 3ª are made somewhat longer than in the construction shown in Fig. 1 so that the free ends of these hooks will have a tendency to swing inwardly under the stress of load, thus tending to keep the ends 9 from becoming detached from the battery handles. Another distinction in this structure is that the top surface of the bar 1 is beveled off somewhat at its two ends so as to make the notches 2 somewhat shallower. This will give the springs 4 a better chance to hold the hooks in adjusted position. The springs 4 are naturally curved because that is the form in which the stock comes, from which these members are made. Therefore, if the bars 1 are straight on the top surface the springs 4 have a tendency to press downwardly quite hard at their outer ends but do not exert much holding force near the middle of their lengths. However, if the bar is cut away as indicated in Fig. 2, the springs tend to have the same holding force throughout their lengths.

From the foregoing it will be seen that I have provided a simple, inexpensive, easily manufactured device for the purpose indicated, that the device is easily applied and removed in use and is very effective for the purpose intended.

Having now described my invention, I claim:

1. A battery lifter comprising a bar having notches in one face thereof, resilient means secured to said bar and lying along said face over said notches, U-shaped supporting members having their bent portions supported in selected ones of said notches and held against rotation in said notches by the resilient means pressing thereagainst.

2. A battery lifter comprising a bar having positioned elements upon one face thereof at opposite sides of the midpoint in the length of the bar, spring means secured to the bar to press against the ends of the positioning elements, and supporting hooks supported on the bar between said positioning elements, said hooks having a central portion located between the positioning elements and their ends bent into battery supporting hooks extending in a generally horizontal direction.

3. A hook for a battery lifter comprising an elongated rigid member having a central substantially straight portion, having at the ends thereof arms bent at substantially right angles thereto and defining a plane, other portions of the elongated member at the ends of the arms remote from said central portion being bent at an acute angle to said arms and defining a plane making an acute angle with the first mentioned plane, said other portions having their free ends bent at an acute angle thereto and lying substantially in the planes defined by said arms and said other portions.

4. A battery lifter comprising a bar serving as a handle, and a pair of hook members adjustably connected to the end portions of the bar whereby the effective span of the device may be adjusted to fit batteries of different sizes, one of said hook members comprising a substantially straight portion and a pair of U-shaped battery engaging elements at the respective ends of said portion, the free arm of each U-shaped element inclining toward the bar engaging portion of the hook member.

5. In a structure of the general nature indicated, a bar having adjacent its opposite ends, and on one side thereof, notches for the reception of hook members, a hook member to be attached in one or another of the notches at each end of the bar, and latching means on the bar for holding the hooks in place thereon, the hooks having arms at opposite ends thereof and the said arms being inclined toward each other.

In witness whereof, I hereunto subscribe my name to this specification.

JOHN PETERSEN.